(12) United States Patent
Vannoy et al.

(10) Patent No.: US 8,572,856 B1
(45) Date of Patent: Nov. 5, 2013

(54) ADJUSTABLE GRADE FINDER

(75) Inventors: Levi Cleveland Vannoy, Lenoir, NC (US); Barry Steven Privett, Lenoir, NC (US)

(73) Assignee: Levi Vannoy, Lenoir, NC (US)

( * ) Notice: Subject to any disclaimer, the term of this patent is extended or adjusted under 35 U.S.C. 154(b) by 189 days.

(21) Appl. No.: 13/286,264

(22) Filed: Nov. 1, 2011

Related U.S. Application Data

(60) Provisional application No. 61/415,877, filed on Nov. 22, 2010.

(51) Int. Cl.
*G01C 15/06* (2006.01)
(52) U.S. Cl.
USPC .......................................................... 33/296
(58) Field of Classification Search
USPC ................... 33/1 H, 293, 296, 521
See application file for complete search history.

(56) References Cited

U.S. PATENT DOCUMENTS

| | | | | |
|---|---|---|---|---|
| 173,938 | A * | 2/1876 | Gieseler | 33/293 |
| 1,957,838 | A * | 5/1934 | Keuffel | 33/296 |
| 3,117,378 | A * | 1/1964 | Bowen | 33/293 |
| 3,492,729 | A * | 2/1970 | Crain | 33/296 |
| 4,458,425 | A * | 7/1984 | Hester | 33/296 |
| 4,899,452 | A * | 2/1990 | Schafer | 33/296 |
| 6,657,734 | B1 * | 12/2003 | Monz et al. | 33/293 |
| 8,201,340 | B2 * | 6/2012 | Steffensen | 33/296 |
| 2006/0283030 | A1 * | 12/2006 | Lee | 33/293 |
| 2013/0133214 | A1 * | 5/2013 | Steffensen | 33/296 |

* cited by examiner

*Primary Examiner* — G. Bradley Bennett
(74) *Attorney, Agent, or Firm* — Monty Simmons; Simmons Patent

(57) ABSTRACT

Disclosed is an adjustable grade finder that can be used to measure one or both of a relative distance delta between two points or an absolute distance delta between two points with no or minimal calculations. For one embodiment the adjustable grade finder is configured to be associated with a leveling pole so that the combination provides a tool for making measurements that represent a relative distance delta between two or more points while eliminating the need to perform mathematical calculations thereby simplifying the task of leveling a grade over an area of ground.

20 Claims, 19 Drawing Sheets

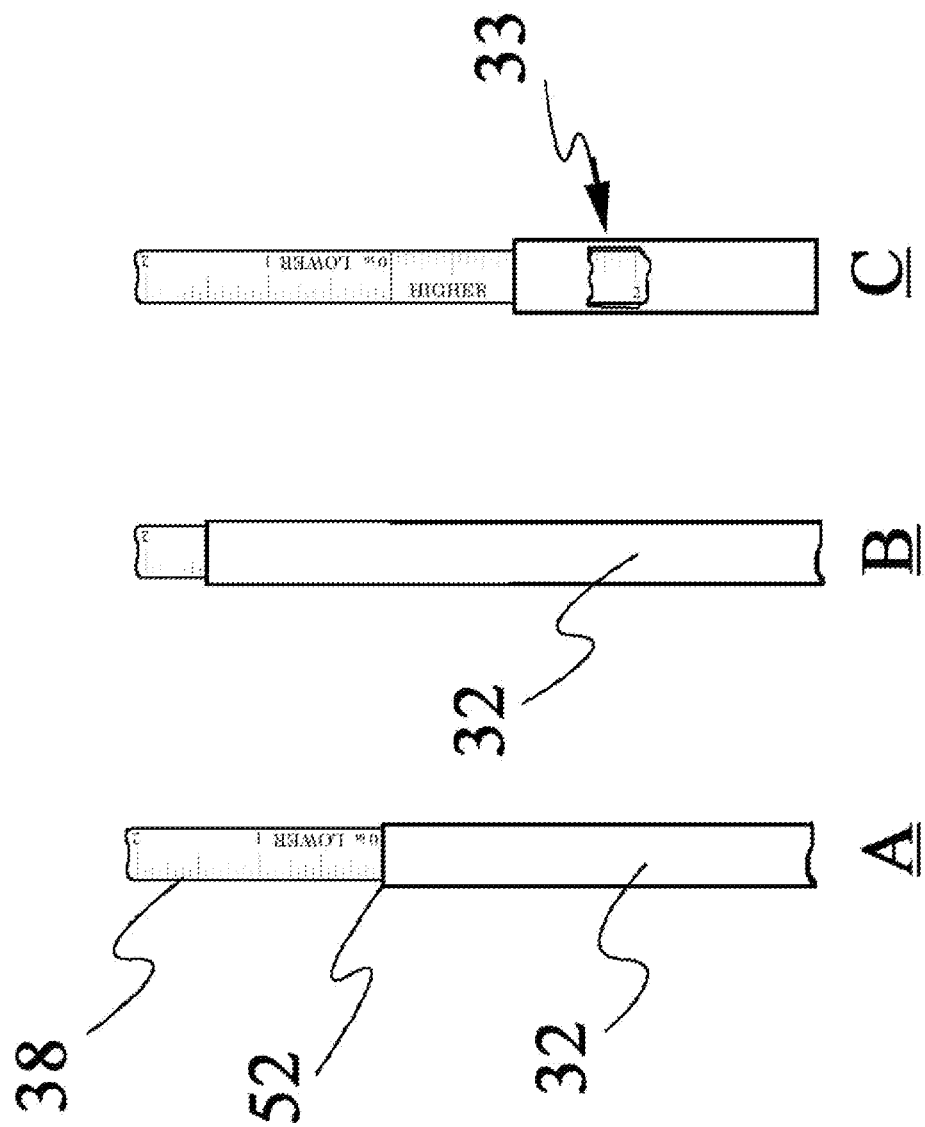

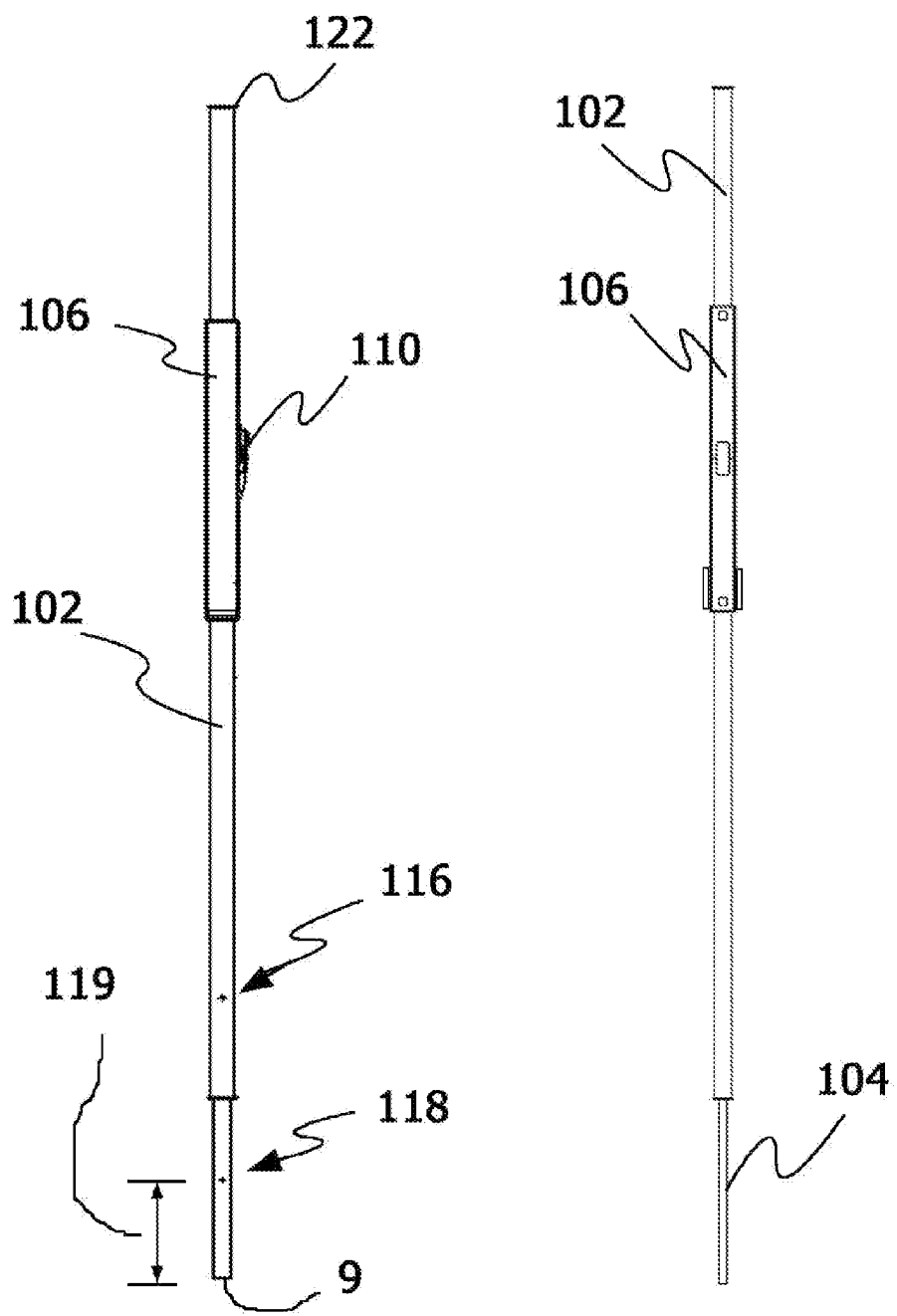

ADJUSTABLE GRADE FINDER

CLAIM TO PRIORITY

This application claims priority to U.S. Provisional Patent Application 61/415,877, filed on Nov. 22, 2010, the entire contents of which are incorporated by this reference for all purposes for and all that it discloses.

TITLE

Adjustable Grade Finder

Technical Field of the Invention

The present invention relates to an apparatus and method for providing an adjustable measuring device that measures a relative distance delta between two or more points. One embodiment includes a grade finder that measures the distance delta between a reference point and a measurement point. For such embodiment, such apparatus may include an adjustable device that is associated with a leveling pole for providing a relative height delta between at least two points.

BACKGROUND

People frequently find it necessary measure distances. One area in particular where distance measurements are required is in the construction business. One specific example of a construction activity that requires measuring distances is establishing a desired grade for a particular area of land. The "grade" (a.k.a. slope, incline, gradient, pitch or rise) of a physical feature, topographic landform or constructed element, refers to the amount of inclination of that surface to the horizontal plane or reference plane. One special case of gradient occurs where the grade equals zero thereby indicating gravitational level.

For example, when determining if a particular area of ground is level, a leveling pole is frequently used. Most conventional leveling poles comprise an outer liner member and a plurality of inner liner members associated together to form a telescopically adjustable relationship. A scale is provided on a surface of the plurality of members wherein such scale is suitable for measuring distance. The plurality of members is extended as needed and such scale is used to measure the distance of interest.

Consider the activity of preparing a site for the installation of a flat concrete pad. One initial task is to establish one point that represents the final finished surface height (i.e. a "reference point"). Next, using a prior art laser system and leveling pole, a laser emitter is set on a tripod a distance from the reference point and typically outside the area to be leveled. A laser detector is associated with a leveling pole and the leveling pole is positioned at the reference point. The leveling pole is adjusted/extended (thereby causing the laser detector to move) until the detector signals that it has detected the laser light emitted by the laser emitter. Using the measuring marks provided on the leveling pole, the height at the reference point is determined (i.e. the zero point). The height measured at the reference point is the "reference height". Suppose such reference height is 4 feet 5 inches. Next the leveling pole is moved to a second point of interest and the process repeated and the height of the laser detector relative to the laser emitter at such second point of interest is determined to be 5 feet 7 and ¾ inches. By subtracting the reference height measurement from the height measurement for the second point of interest, the user determines a height delta between the two points. In the above example, the height delta is 1 foot and 2.75 inches (5'7.75"−4'5"=1'2.75"). Such process is repeated as many times as needed to level the area of interest.

As noted above, to determine the difference in height between point two and the reference point, a calculation is required. Such is one drawback of such prior art system as such calculation often requires a calculator or a pencil and paper to perform accurately. Quite often unskilled workers are used who may not be proficient in making such calculations and such workers may make a calculation error resulting in wasted work and lost time. Indeed, even those skilled in making such calculations may make errors. In all cases, time is required to make such calculations (even accurate calculations). Generally speaking, time is money and such is particularly true in the construction business.

Additionally, when moving between different points of interest, it is often necessary to move the laser detector to a different point along the leveling poll and perhaps a different leveling pole member. Such adjustments also take time and provide yet another opportunity to make additional errors.

The present invention eliminates or minimizes all of the above-mentioned drawbacks and disadvantages associated with the use of such prior art system.

SUMMARY

Objects and advantages of the invention will be set forth in the following description, or may be obvious from the description, or may be learned through practice of the invention.

Broadly speaking, a principal object of the present invention is to provide an adjustable grade finder that can be used to provide a measurement that is at least one of (a) a relative distance delta between two points and (b) an absolute distance delta between two points, so that no calculations are required to determine said distance delta.

Another general object of the present invention is to provide an adjustable grade finder that is configured to be associated with a leveling pole so that the combination provides a tool for making measurements that represent a relative distance delta between two points so that calculations are required to determine said relative distance delta.

Another general object of the present invention is to provide an adjustable grade finder that is configured to be associated with a leveling pole so that the combination provides a tool for measuring an absolute distance delta between two points so that minimal calculations are required to determine said absolute distance delta.

Another general object of the present invention is to provide a method of determining at least one of (a) a relative distance delta, (b) an absolute distance delta, between two points without the need for calculations, and (c) an absolute distance delta, between two points, with one simple calculation requirement.

Additional objects and advantages of the present invention are set forth in, or will be apparent to those skilled in the art from, the detailed description herein. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 7 is a close up view of the adjustable grade finder displaying a measurement for three measurement points;

FIG. 8c is a side view of the alternative embodiment depicted in FIG. 8a;

FIG. 8d is a back view of the alternative embodiment depicted in FIG. 8b;

Figure 1:
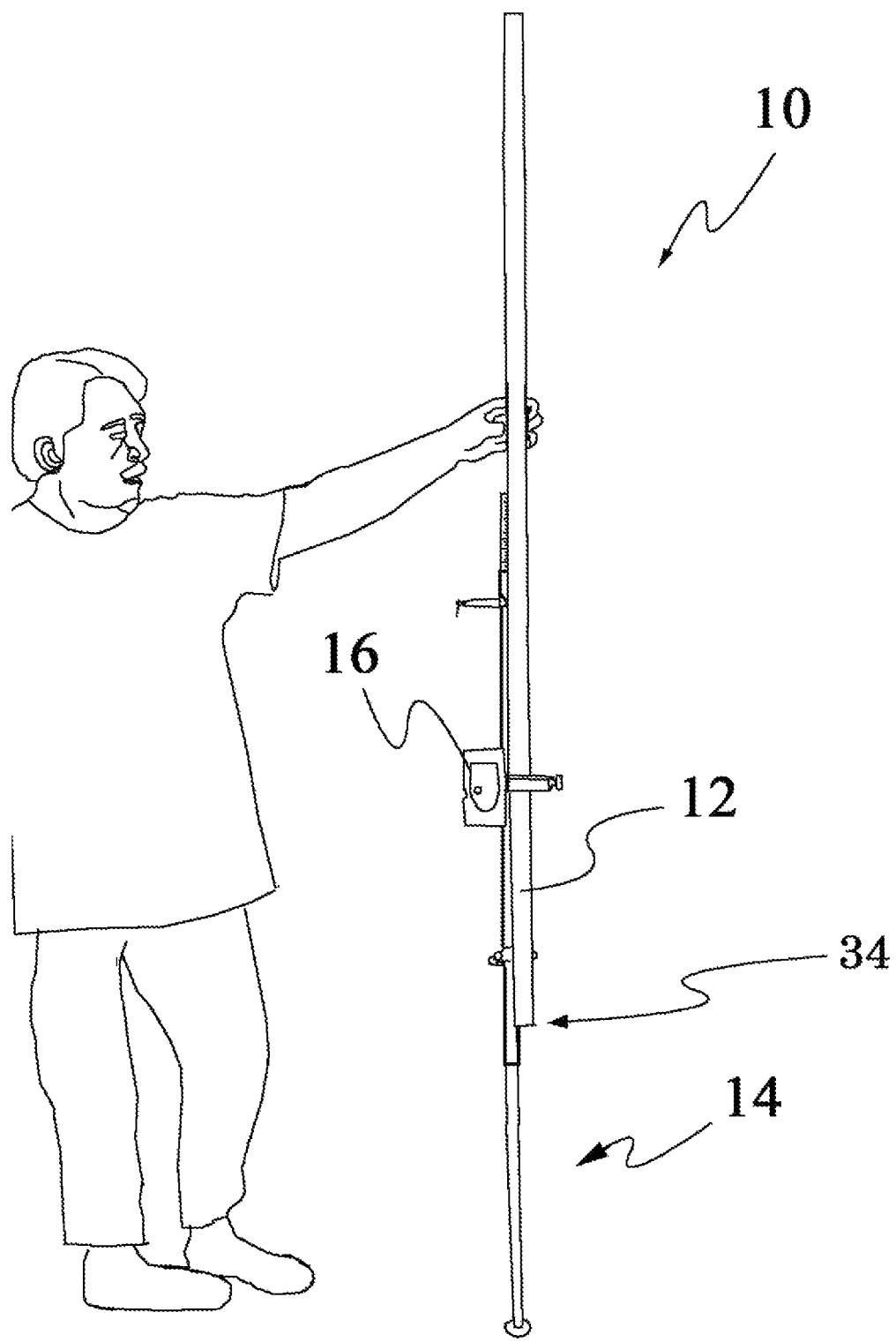
FIG. 1 is a side view of one exemplary embodiment of the invention comprising an adjustable grade finder associated with a leveling pole and a laser detector.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. Indeed, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

It should be appreciated that this document contains headings. Such headings are simply place markers used for ease of reference to assist a reader and do not form part of this document or affect its construction.

DEFINITIONS

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.)

As used in this document, the term "relative distance delta" refers to a measurement that represents a difference in the distance between two points. For example, suppose one wishes to measure the difference in height between two points. One places a marker at Point A (the zero point) and moves the marker to Point B and determines that Point B is 2 inches higher than point A. One knows the relative difference in height (i.e. relative distance delta) between Point A and Point B but one does not know how high either Point A or Point B is relative to a third point.

As used in this document, the term "absolute distance delta" refers to a relative distance delta that is referenced to a third point. For example, suppose one wish to measure not only the difference in height between two points but also how high each point is relative to a third point. One places a marker at Point A which is a known distance (say 2 feet) above a reference point (such as a floor). One then moves the marker to Point B and determines that Point B is 2 inches higher than point A and 2 feet 2 inches above the reference point. For such example, one not only knows the relative difference delta (i.e. 2 inches) between Point A and Point B, one also knows the absolute distance delta of Point A and Point B referenced to a third point. (i.e. Point A is 2 feet high and point B is 2 feet 2 inches high—above the reference point).

EMBODIMENTS

While the particulars of the present invention may be adapted for use in any process for measuring the absolute and relative distance between two points, the examples discussed herein are primarily in the context of measuring the relative and/or absolute difference in height between two or more points.

Figure 2:
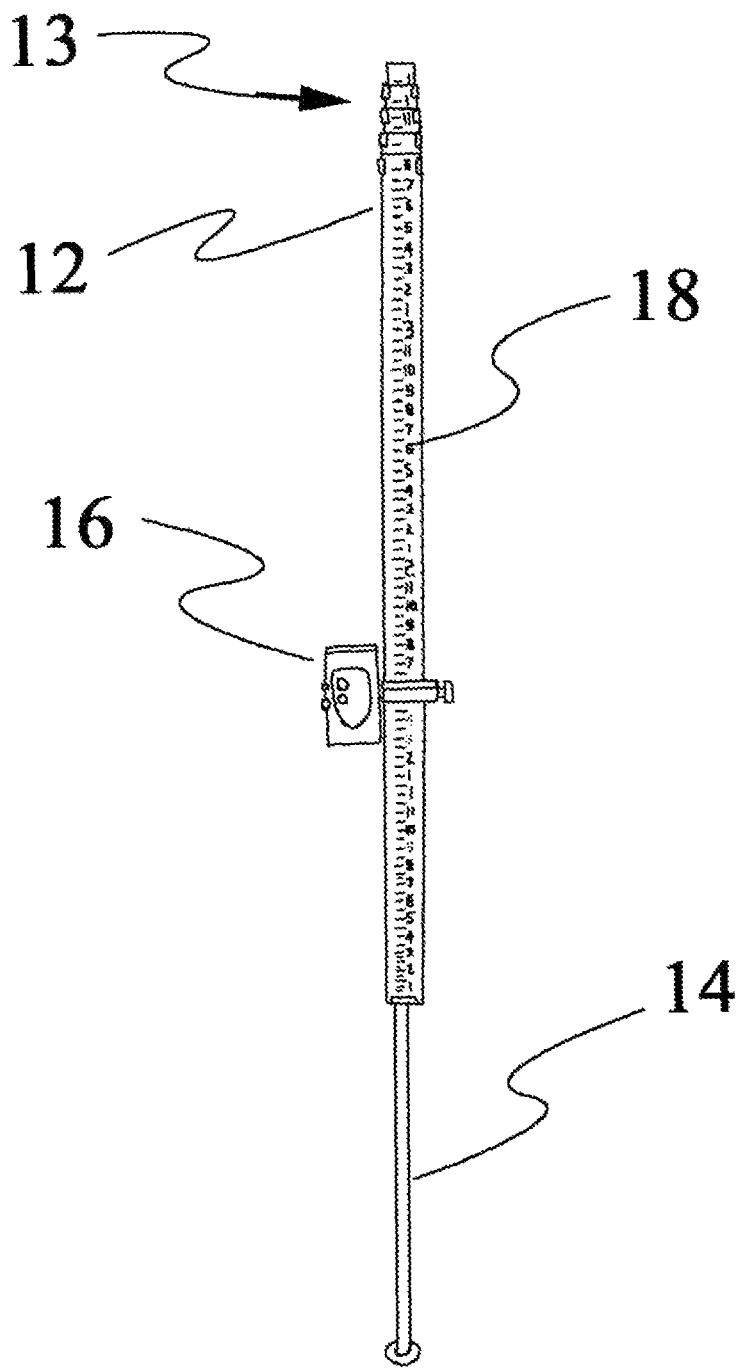
FIG. 2 is a front perspective view of the exemplary embodiment of the invention depicted in FIG. 1.
Figure 3:
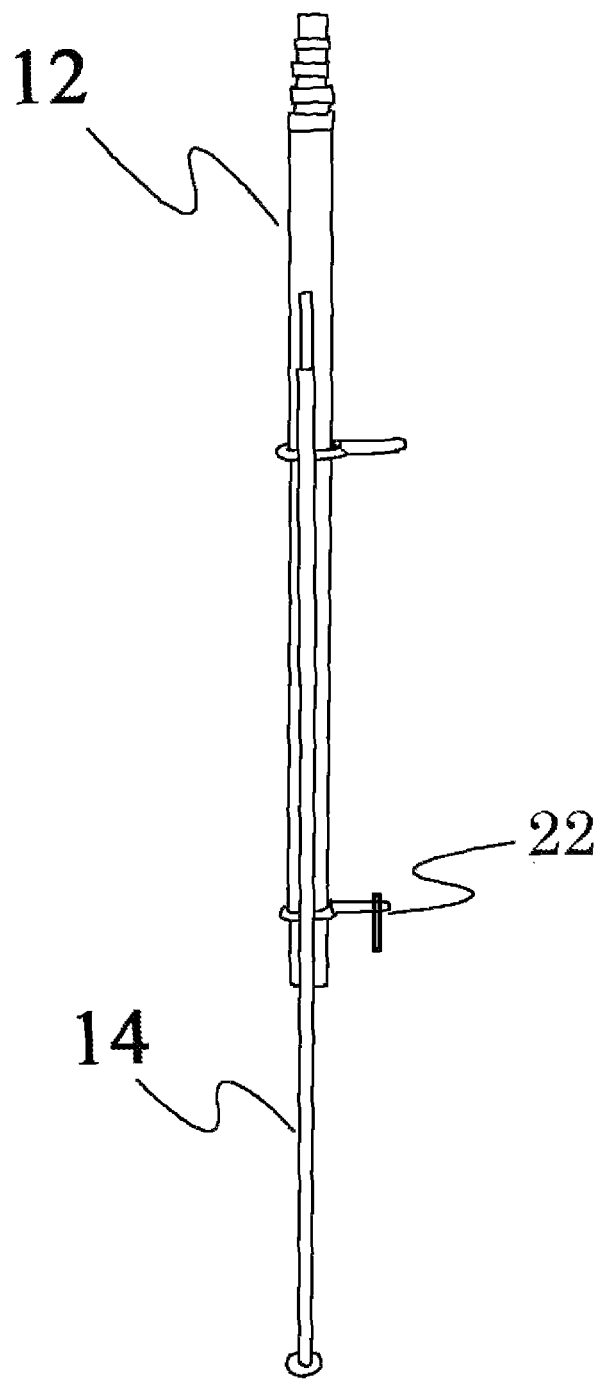
FIG. 3 is a back perspective view of the embodiment depicted in FIG. 1.

Referring now to FIG. 1, a side view of one exemplary embodiment of a measuring system (10) comprising one embodiment of an adjustable grade finder (14) associated with a prior art leveling pole and a prior art laser detector is presented. The measurement system (10) is being held by a user in a vertical alignment relative to a surface (i.e. floor, ground, bottom surface of a ditch, etc.). System (10) includes a leveling pole (12), adjustable grade finder (14), and laser detector (16). Similarly FIG. 2 is a front perspective view of the measurement system (10) and FIG. 3 is a back perspective view. It should be appreciated that adjustable grade finder (14) is not restricted to being used only with leveling poles and laser systems and may be used with any number of well-known prior art devices that are used for measuring distances. In addition, some embodiments of the invention use only an adjustable grade finder (14) with systems such as prior art laser systems.

As best seen in FIG. 2, the prior art leveling pole (12) comprises an outer liner member and a plurality of inner liner members (13) associated together to form a telescopically adjustable relationship. A scale (18) is provided on the plurality of members suitable for measuring distance. The plurality of members is extended as needed to measure the distance of interest.

Figure 4:
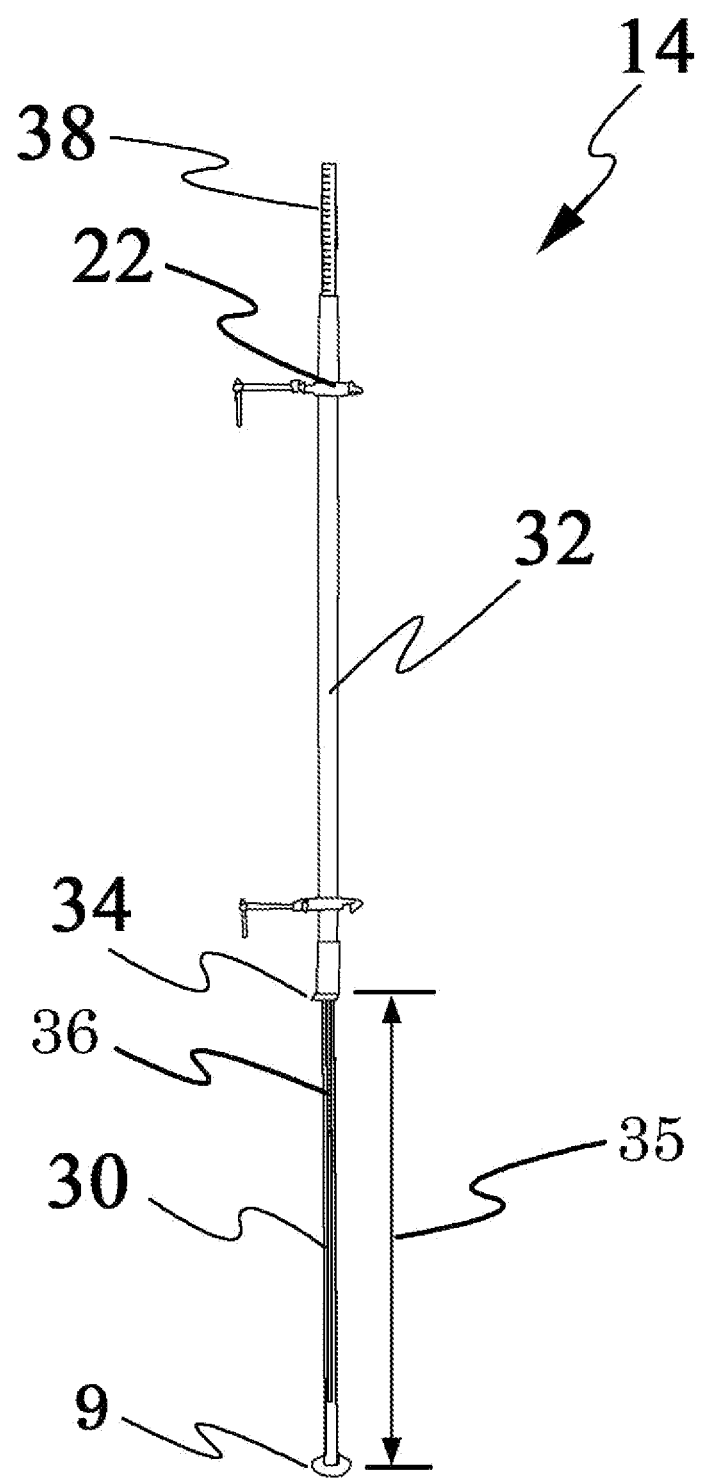
FIG. 4 is a front view of one embodiment of an adjustable grade finder not associated with a measuring device.

Referring now to FIG. 4, the adjustable grade finder (14) comprises an outer member (32) defining an elongated OM-structure having an OM-first-end and an opposing OM-second-end. The OM-structure is at least partially hollow thereby defining an OM-outside perimeter and an OM-inside perimeter. Similarly, adjustable grade finder (14) further comprises an inner member (30, FIG. 5) defining an elongated IM-structure having an IM-first-end, an opposing IM-second-end, and wherein the outer perimeter of said IM-structure is smaller than said OM-inside perimeter and wherein said IM-first-end is configured for being inserted into and movably associated with said OM-first end to form a telescopic association.

Referring now to FIG. 1 and FIG. 4, for the currently preferred embodiment, adjustable grade finder (14) further comprises a support interface (34) that is one of (a) integral to said OM-structure and (b) mechanically associated with said OM-structure. For the embodiment depicted in FIG. 4, support interface (34) is mechanically associated with said OM-Structure. For such embodiments, the bottom edge of leveling pole (12) is associated with support interface (34). Leveling pole (12) is further mechanically associated with adjustable grade finder (14) using attachment points (22). One exemplary embodiment of an attachment point is a clamp as depicted in the various figures. It should be appreciated that any number of devices may be used as attachment points (22) to associate leveling pole (12) to the adjustable grade finder (14) including screws, magnetics, hook and loop devices, and straps.

As best seen in FIG. 4, adjustable grade finder (14) defines an offset distance (35) that represents the distance from the bottom end (9) and the support interface (34) when in a default position. The term "default position" refers to the position of support interface (34) relative to bottom end (9) when no adjustment force has been applied to the adjustable grade finder (14). One of ordinary skill in the art will appreciate that, if an absolute height distance is desired, the offset distance (35) between support interface (34) and the bottom end (9) of inter rod (30) defines an offset value that one adds to the appropriate leveling pole (12) value to determine an absolute distance (as described in more detail below). Ideally, such offset value (35) is a predefined even distance such as 2 feet. Consequently, for such configuration, one simple calculation will be required where the predefined offset distance (35) is preferably an even distance, such as two feet, when the system is at the zero point (i.e. a default position). Such a configuration allows the predefined offset value (35) distance to be easily added to the overall measurement if an absolute height value is needed as will be explained in further detail later in this document.

Figure 5:
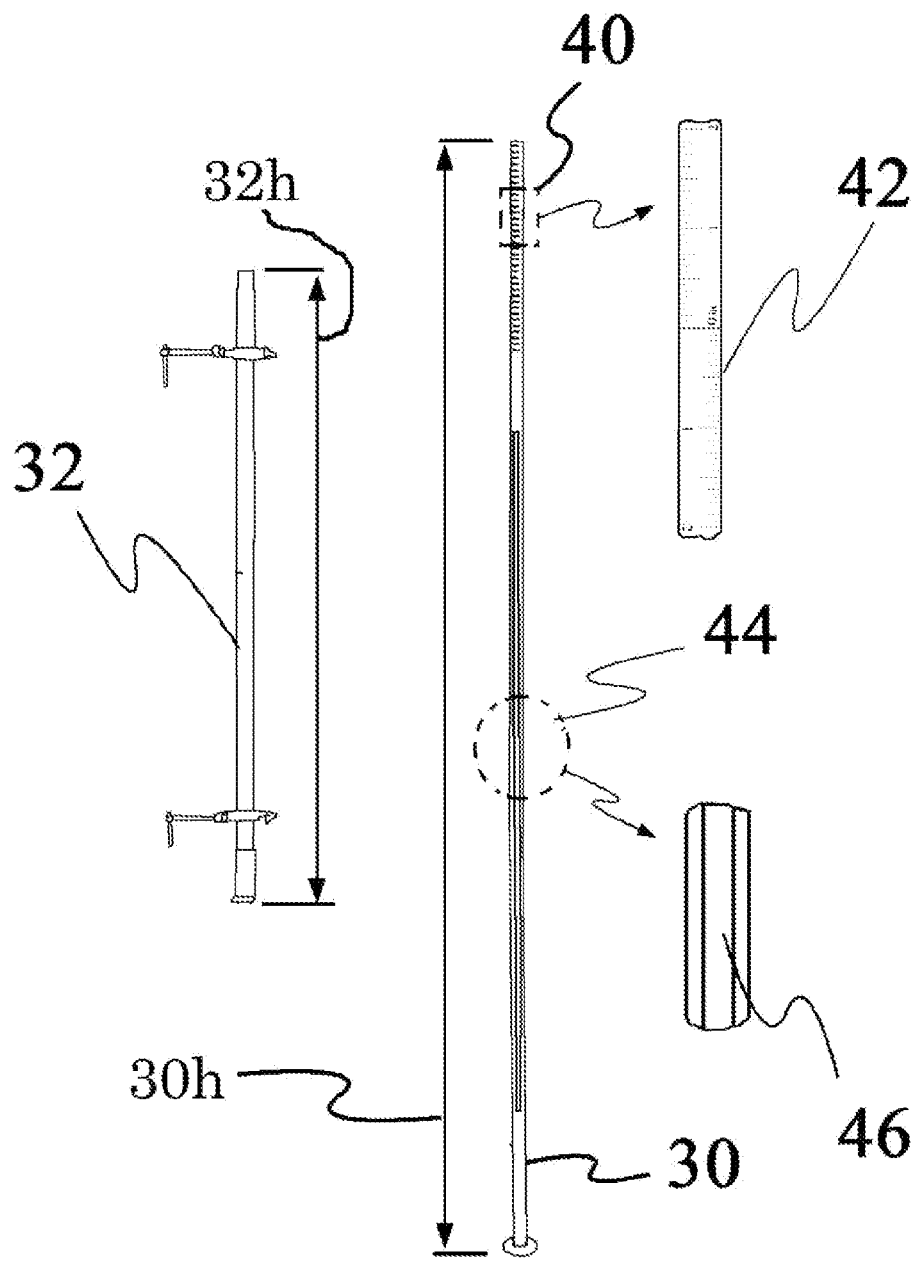
FIG. 5 is a front view of the adjustable grade finder of FIG. 4 partially disassembled.

Referring now to FIG. 4 and FIG. 5, adjustable grade finder (14) is considered in more detail. For the currently preferred embodiment, adjustable grade finder (14) comprises an outer member (32) and an inner member (30) mechanically associated to form a sliding telescopic relationship. It should be appreciated that other moveable relationships may be used (such as a telescopically adjustable relationship with or with a resilient component) without departing from the scope of the invention. For the present embodiment of adjustable grade finder (14), outer member (32) and inner member (30) define tubes with outer member (32) having a slightly larger diameter than the diameter of inner member (30) so that inner member (30) can be inserted into outer member (32). As shown in FIG. 5, for the currently preferred embodiment, outer member (32) has a length (32h) of about thirty-two inches and inner member (30) has a length (30h) of about fifty nine inches. One of ordinary skill in the art will appreciate that any desired lengths for outer member (32) and inner member (30) may be used without departing from the scope and spirit of the current invention.

Figure 6:
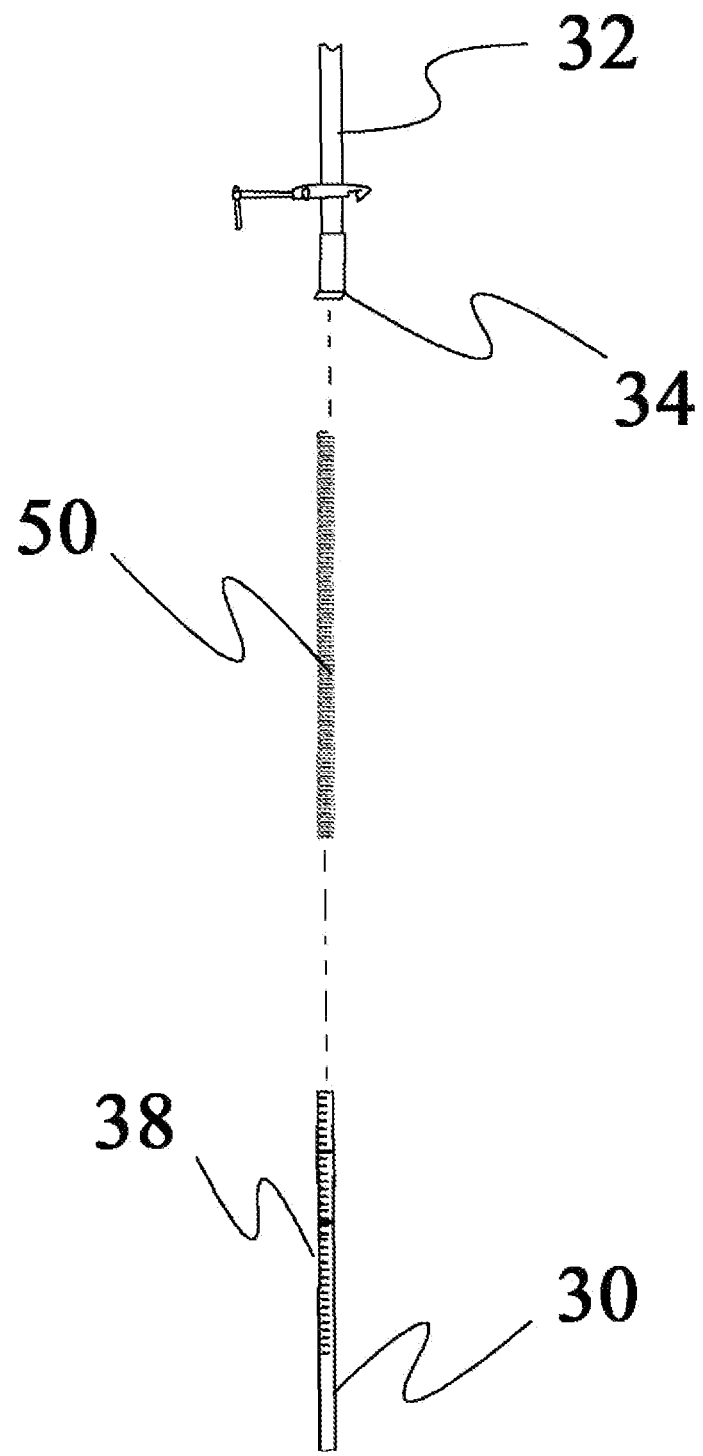
FIG. 6 is an exploded view showing an internal resilient member.

As noted above, for the currently preferred embodiment of the invention, the adjustable grade finder (14) is configured so that inner member (30) is inserted into outer member (32) so that outer member (32) may slide along the surface of inner member (30). To return and maintain the adjustable grade finder (14) measurement indicator to the zero position (default position) when no adjustment force is being applied, after each use, adjustable grade finder (14) may further comprises a resilient component (50) (FIG. 6). For the current embodiment, resilient component (50) is a spring suitably sized for being inserted inside inner member (30). Restated, the diameter of resilient component (50) is slightly less than the inside diameter of inner member (30).

Figure 6B:
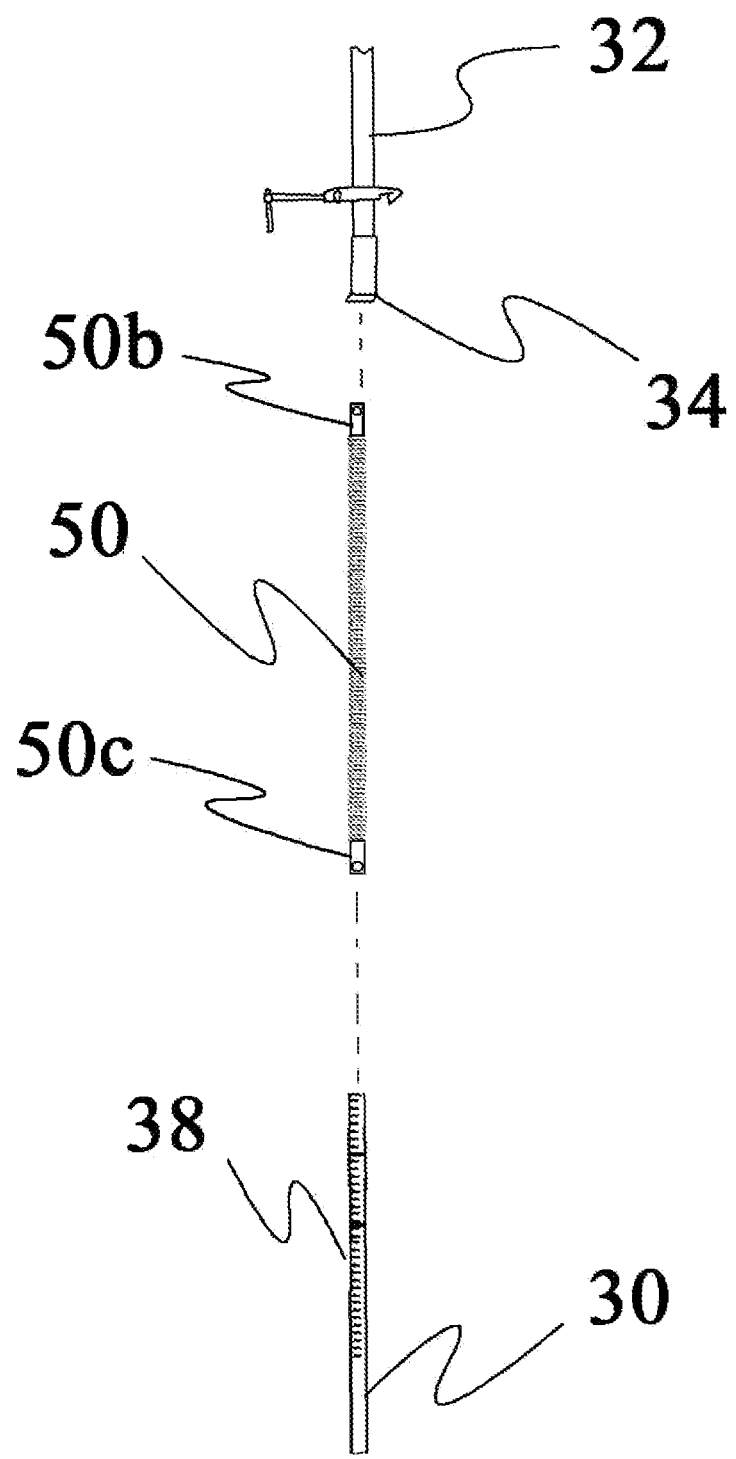
FIG. 6b is an exploded view showing an internal resilient member comprising attachment points.

As shown in FIG. 6b, for one embodiment each end of resilient component (50) is configured with one or more attachment points such as attachment point 50b and attachment point 50c.

As shown in FIG. 5, inner member (30) defines a slot (46) that runs along at least one side of inner member (30) a predefined distance. One alternative embodiment comprises two slots 180 degrees apart along the circumference of inner member (30) so that an attachment mechanism can extend all the way through inner member (30). The upper portion of inner member (30) is configured for being mechanically associated with attachment point (50b) of resilient component (50). Similarly, the back side of support interface (34) defines an extension that is configured to extend into slot (46) and mechanically associate with attachment point (50c) of resilient component (50) thereby supporting the support interface (34) and items supported by support interface (34). Additionally, the length of resilient component (50) is selected so that the resilient component (50) supports the support interface (34) at a height equal to the previously described offset distance (35) when the adjustable grade finder (14) is at the zero point (the default). Notably an adjuster mechanism, such as a thumbscrew, may be associated with at least one of the resilient component (50) attachment points and configured to be used to fine-tune the default position.

Figure 2B:
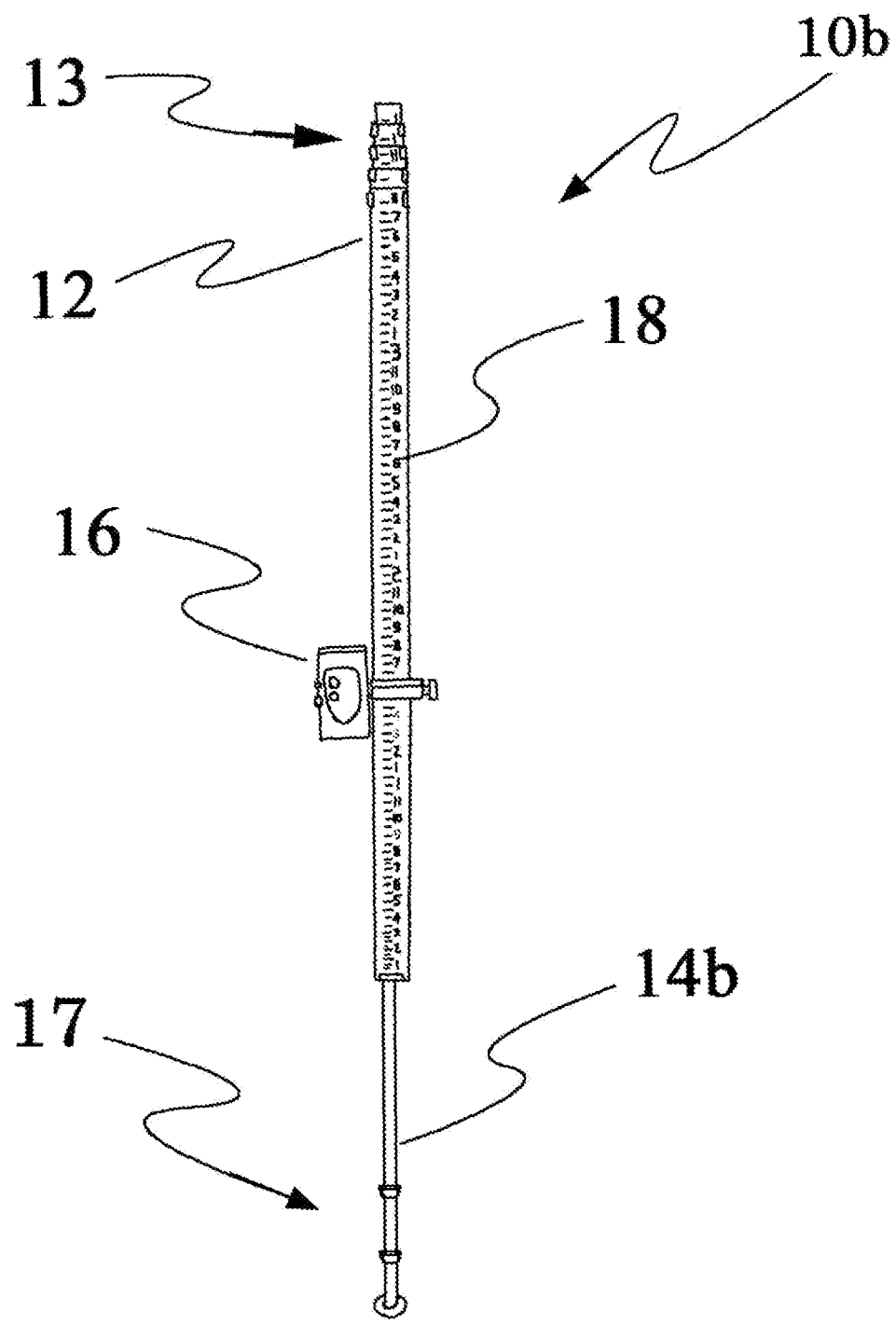
FIG. 2b is a front perspective view of the exemplary embodiment of the invention depicted in FIG. 2 with an adjustable bottom section.

Referring back to FIG. 2b, one possible alternative embodiment is considered. Here, an adjustable grade finder (14b) is associated with a prior art leveling pole (18) and a prior art laser detector (16). The measurement system (10b) is held by a user in a vertical alignment relative to a surface (i.e. floor, ground, bottom surface of a ditch, etc.). For this embodiment, system (10b) includes a leveling pole (12), adjustable grade finder (14b), and laser detector (16). For the current embodiment, adjustable grade finder (14b) further comprises a lower adjustable section (17). Lower adjustable section (17) is configured to be adjustable to provide for an adjustable offset value (35) and may define any type of suitable adjustable mechanism (e.g. telescopically adjustable relationship, a sliding relationship, etc.). Preferably, lower adjustable section (17) further defines measurement marks configured for informing a user of the value of offset value (35) to allow for measurements of absolute distance deltas.

One of ordinary skill in the art will appreciated that lower adjustable section (17) is useful for determining the distance delta of a surface lower than the surface supporting a user. For example, such a configuration may be useful for measuring a point or the debt of a ditch while standing outside of such ditch (i.e. without having to stand on such lower surface). For example, suppose one needed to measure the grade of a ditch. Without an adjustable section (17), one would be required to stand in such ditch and place lower end (9) on the floor of the ditch to make such measurements. Such an activity comes with an elevated risk of injury as ditches have been known to cave in on workers making such measurements. In contract, using adjustable grade finder (14b), one may stand outside such ditch and extend adjustable section (17) until it reaches the floor of such ditch thereby allowing the grade to be measured from outside such ditch.

Figure 5B:
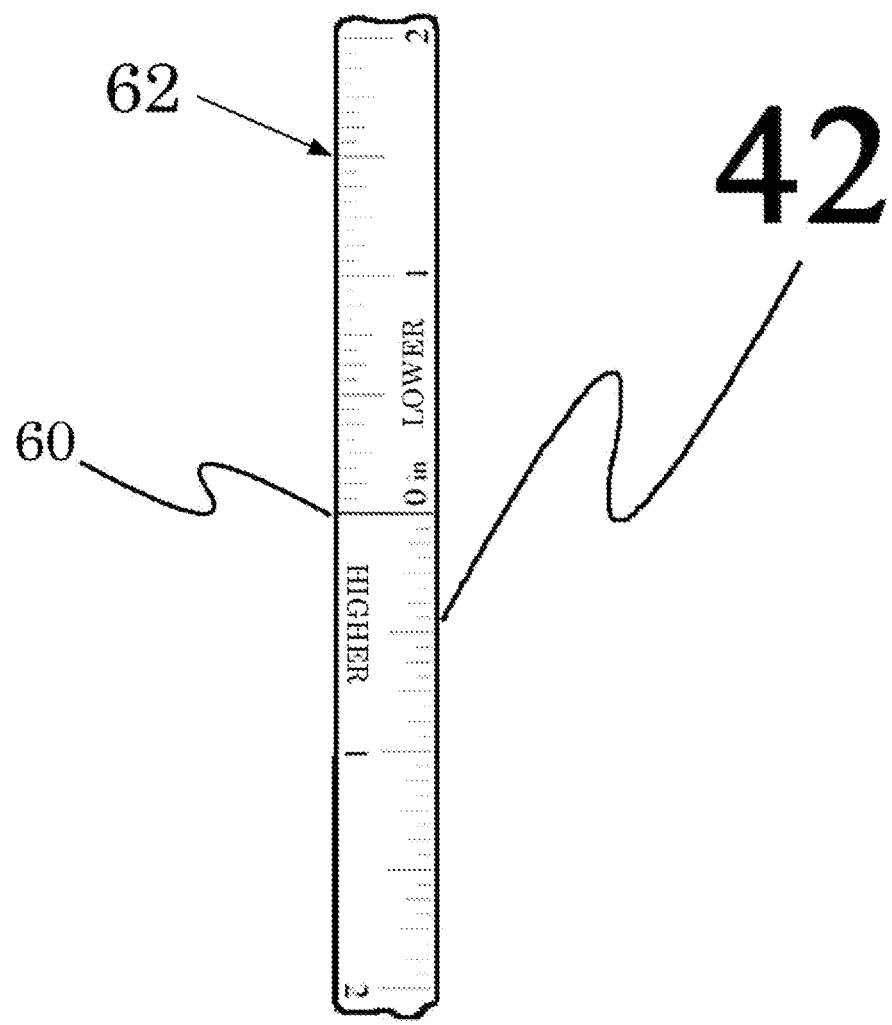
FIG. 5b is a front close up view of one exemplary embodiment of the measurement scale depicted in FIG. 5.

As best seen in FIG. 5b and FIG. 7, at least the top section (38) of inner member (30) comprises at least one scale (42). Scale (42) may be of any type and unit desired (e.g. metric, British Imperial, U.S., Japanese, Chinese Imperial, That, etc.). For the current embodiment, scale (42) is in feet. As shown in FIG. 5b, scale (42) has a zero point (60). For example, when the adjustable grade finder (14) is used to measure a relative height delta between Point A and Point B, and the height delta is determined to be at point (62) (FIG. 5b), then such Point B is 1.5 feet LOWER than Point A. Such will be considered in more detail below.

Adjustable Grade Finder with Measurement Slide

Figures 8A, 8B:
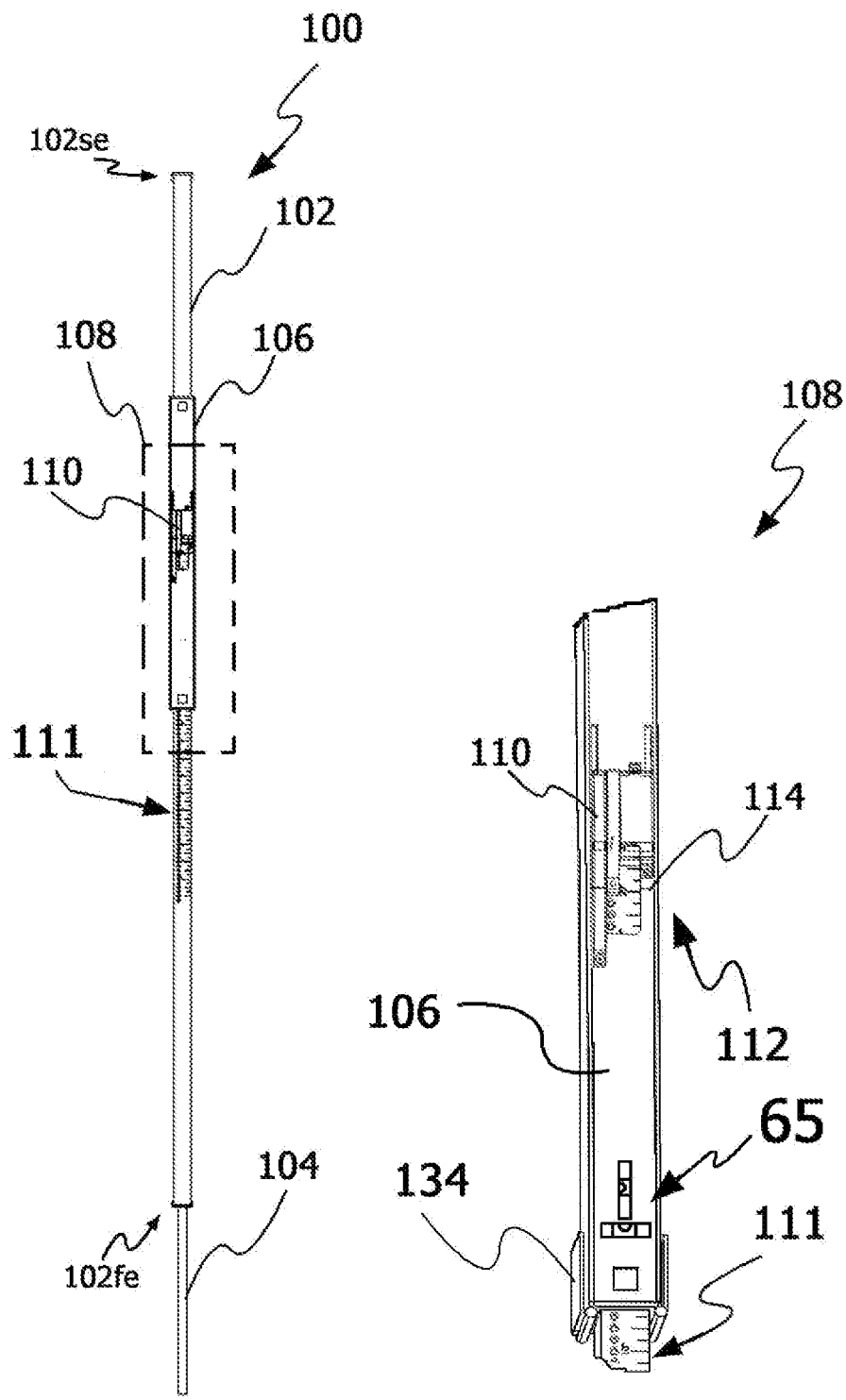
FIG. 8a is a front view of one possible alternative embodiment of the invention comprising a telescopically adjustable grade finder with no support interface.
FIG. 8b is a close up view of one possible embodiment of the invention depicted in FIG. 8a with two fold up support interfaces.

Referring now to one possible alternative embodiment as depicted in FIG. 8a through FIG. 15, adjustable grade finder (100) comprises a measurement slide (106). Referring now to FIG. 8a, adjustable grade finder (100) comprises an inner member (104) movably associated with an outer member (102). For the current embodiment, the exterior perimeters of both inner member (104) and outer member (102) define a rectangular elongated shaft. Outer member (102) further defines a structure that is at least partially hollow. For the exemplary embodiment depicted in FIG. 8a, the outer perimeter of outer member (102) defines an elongated rectangular shaft defining a first end (102fe) and an opposing second end (102se) wherein the rectangular shaft is hollow from said first end to said second end thereby defining an inside perimeter. For the preferred embodiment, the distance from first end (102fe) to second end (102se) is about 60 inches and the outside perimeter has sides that are 1.5 inches by 1.0 inch long defining while having a wall thickness of about 0.125 inches.

Similarly, inner member (104) further defines a structure that may be one solid piece, one hollow piece, or one partially hollow piece. For the exemplary embodiment depicted in FIG. 8a and FIG. 10, inner member (104) defines a hollow piece to reduce weight and construction cost. The outer perimeter of inner member (104) defines an elongated rectangular shaft defining a first end (104fe) and an opposing second end (105se) wherein the rectangular shaft is hollow from said first end to said second end thereby defining an inside perimeter for the inner member (104). One of ordinary skill in the art will appreciate that for such a configuration, the shape of inner member (104) is similar to but smaller than the shape defined by outer member (102). For the preferred embodiment, the distance from first end (104fe) to second end (104se) is about 59 inches and the outside perimeter has sides that are 1.0 inches by 0.5 inches long and defining a wall thickness of about 0.125 inches.

Figure 10:
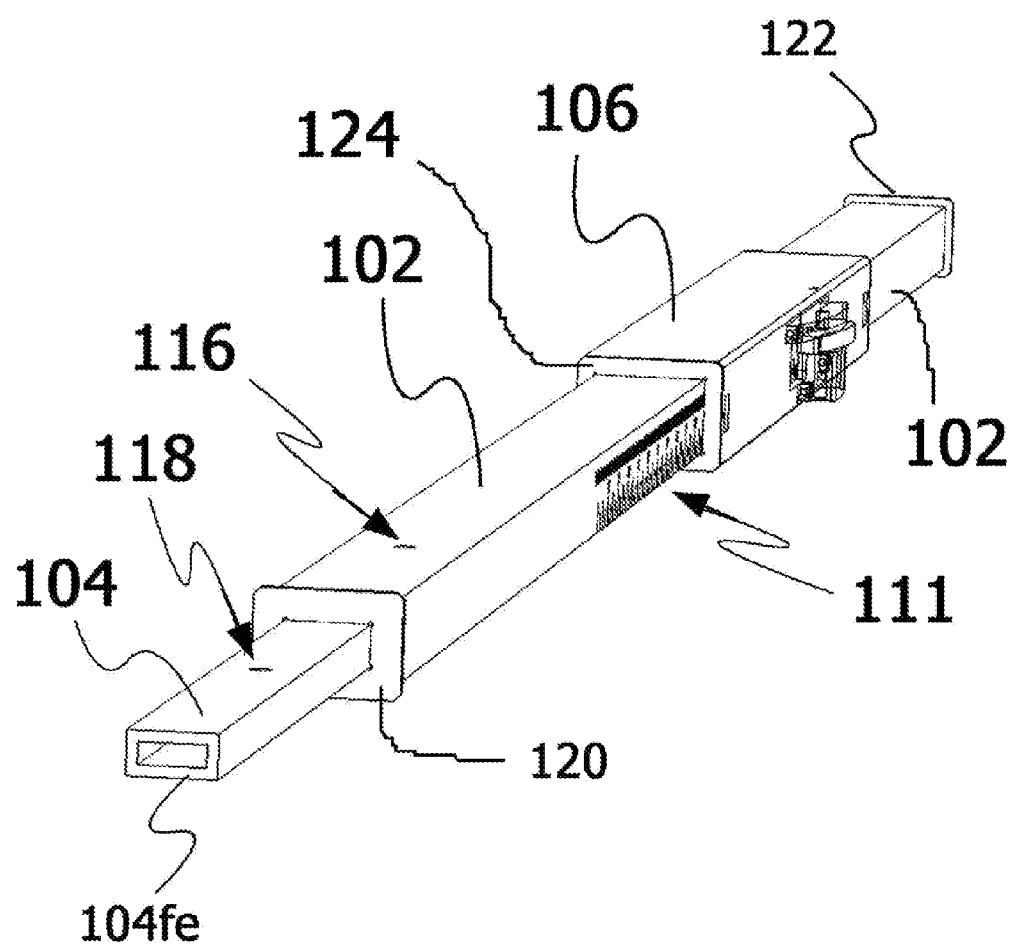
FIG. 10 is a bottom perspective view of the alternative embodiment depicted in FIG. 8a with no support interfaces an no foot associated with the end of the inner member.

As best seen in FIG. 10, to facilitate a more easy movement with relatively tighter tolerances, and outer member bushing (120) is mechanically associated with first end (102fe) of outer member (102). Thus, for the currently preferred embodiment, the outer perimeter of inner member (104) is further slightly less than the inside perimeter outer member bushing (120) so that the inner member (104) may be inserted into and movably associated with outer member (102). One of ordinary skill in the art will appreciate that such a movable association between the outer member (102) and inner member (104) defines a telescopic association where inner member (104) can slide in and out of outer member (102).

Figure 9:
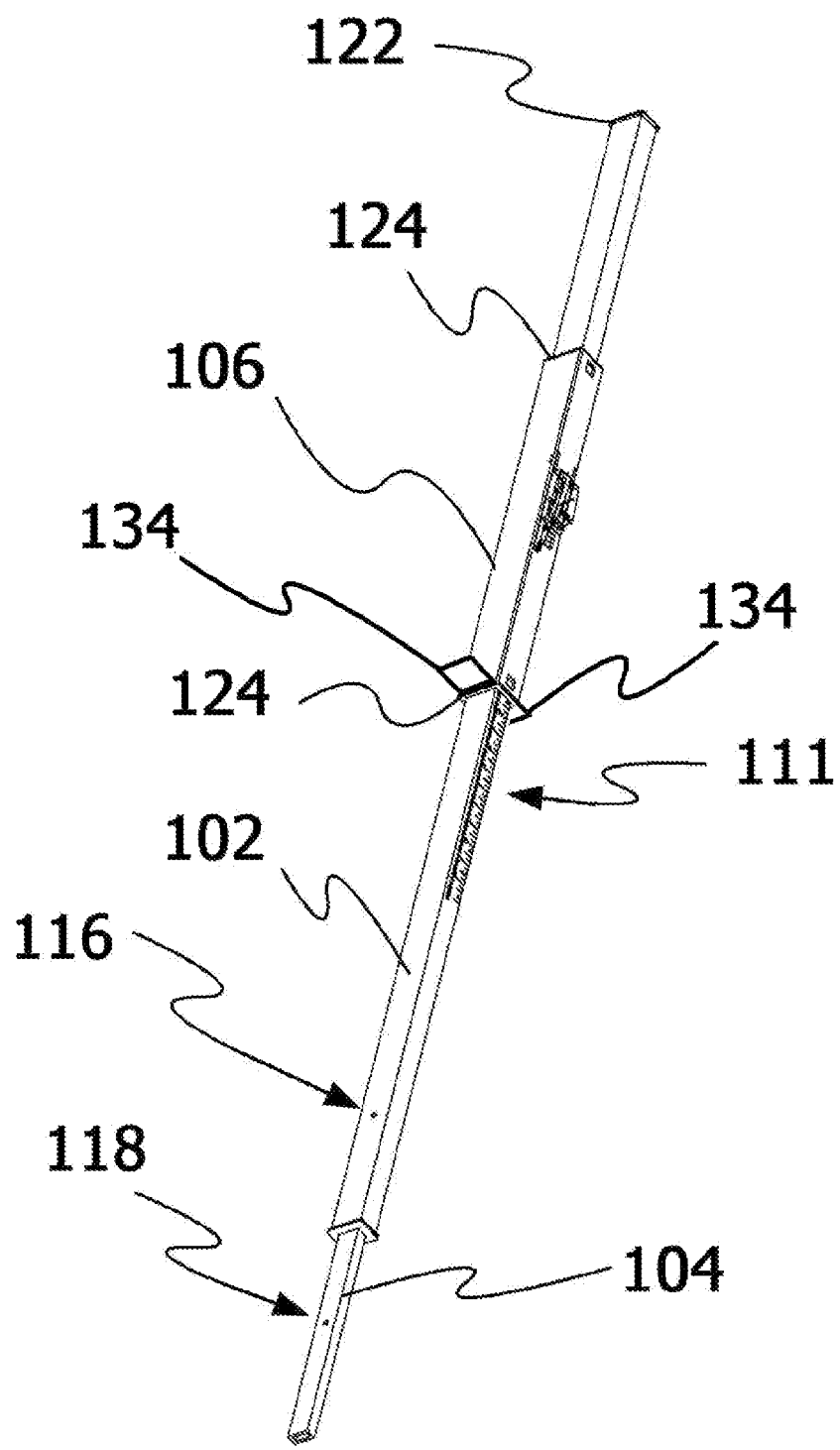
FIG. 9 is a side perspective view of the alternative embodiment depicted in FIG. 8b.

As best seen in FIG. 8c and FIG. 9, the outer member (102) and inner member (104) each comprise at least one attachment point for securing the movable association between inner member (104) and outer member (102). Any suitable mechanisms may be used to provide the function of attachment points (118), however, for the currently preferred embodiment, attachment Points (118) are simply holes configured to receive an attachment point pin. Additionally, for the currently preferred embodiment, inner member (104) comprises a plurality of attachment points (118) whereas outer member (102) comprises only one attachment point (116). Additionally, the distance between each attachment point (118) for inner member (104) is a predefined distance such as 1 foot. Further, as depicted in FIG. 8c, the first attachment point (118) is disposed along inner member (104) a distance (119) from inner member second end (104se) (also called the bottom end (9)) where such distance (119) is equal to said predefined distance. One of ordinary skill in the art will appreciate that such a configuration provides a user-friendly method of making absolute distance measurements. It should be noted that such a configuration will require 2 simple calculations to make an absolute measurement. First, the attachment point used to secure inner member (102) to outer member (104) is determined. Second, the number of attachment points (118) is multiplied by the predefined distance (119). Third, the result of such calculation is added to the measurement reading indicated by the measurement slide. Notably, for the preferred embodiment, the measurement scale defines a typical number line of units having negative numbers decreasing in one direction and positive numbers increasing in the opposite direction separated by a zero point. For example, if the third attachment point (from first end (104fe)) is used to secure inner member (102) to outer member (104), and the predefined distance (119) is 12 inches, and the measure slide (106) indicates a reading of 3.5 inches, the absolute distance from first end (104fe) and to the measurement slide (106) reading will be 39.5 inches [(12 inches×3)+3.5 inches=39.5 inches)]. Notably one should use the same units (such as inches) to identify the predefined distance (118) as is used by the measurement scale so that the numbers can be directly added without then need for conversions. Stated differently, preferably the predefined distance (118) is not scaled in units of "feet" while the measurement scale is scaled in units of "inches". Similarly, unit systems should not be mixed (such as metric and US).

Referring now to FIGS. 8a, 8c, 9 and 10, adjustable grade finder (100) further comprises measurement slide (106). Measurement slide (106) defines a hollow rectangular box defining a slide first end and an opposing slide second end. For the preferred embodiment, the outside perimeter of measurement slide (106) is about 1.5"×2.0" by about 17" long with a wall thickness of about 0.13 inches. For the current embodiment, each end of measurement slide (106) is associated with a measurement slide bushing (124). Consequently, the internal perimeter of measurement slide (106) is slightly larger than the outer perimeter of outer member (102) plus the outer perimeter of measurement slide bushing (124). Thus, the inner perimeter of each measurement slide bushing (124) is slightly larger than the outer perimeter of outer member (102). One of ordinary skill in the art will appreciate that such a configuration will allow measurement slide (106) to be movably associated with outer member (102).

A best seen if FIG. 9, at least one side of the measurement slide is associated with or defines a support interface (134). As depicted in FIG. 9, a support interface (134) is mechanically associated with two opposing sides of measurement slide (106). Notably, embodiments with only one such slide fall within the scope of the invention. Additionally, such support interfaces may be configured to fold up when not in use and may be biased closed (i.e. folded up) using a resilient member such as a spring. As described previously, such support interface (134) is configured to receive and support the bottom edge of a leveling pole (12) which is further mechanically associated with adjustable grade finder (100) using any suitable attachment mechanism such as straps with releasable attachment mechanisms such a buckles, buttons, hook and loop.

As depicted in FIG. 8b, the adjustable grade finder (14) may further comprise at least one of a horizontal and vertical indicator. For such embodiment, measurement slide (106) is configured with HV indicator (65) what is configured to determine if the surface of measurement slide (106) associated with said HV indicator (65) is in horizontal (level) and vertical (plumb). For the presently preferred embodiment, HV indicator (65) is a simple spirit level (i.e. bubble level).

Latching Device

For the purposes of the present invention, a latching device is a device that mechanically associates one component to another where the two components form a movable association and wherein the latching device may be selectively engaged to enable prevent such movement and disengaged to allow such movement. Such latching technology may range in complexity from flexible one piece flat springs of metal or plastic, flip locks, peg and hole locks, and may include magnetic-based technologies as well as snaps, sliding cams, and cam locks.

As noted above, some configurations/embodiments of the invention comprise a resilient member (such as a spring) to return the movable measurement components back to a default position after a measurement. Additionally some embodiments do not have a means for securing/latching the measurement components in a measurement position. Thus, for systems comprising a resilient member and not comprising a latching device, the measurement components will return to a default position automatically after a measurement.

For systems not comprising a resilient member and not comprising a latching device, the measurement components will be free to move at any time a force is applied to the measurement components.

For embodiments that comprise a latching device, the measurement components are secured in place via such latching device. Typically one would disengage such latching device to move the measurement components to make a measurement of interest and then reengage such latching device thereby securing the measurement components at their current position.

For the currently preferred embodiment, there is no resilient component to return the measurement slide (106) (i.e. the measurement component) back to a default position after a measurement. However, the current embodiment does comprise a latching device (110) to secure the measurement slide (106) in a measurement position.

As best seen in FIGS. 8a, 8b, 10 and 14, a latching device (110) is mechanically associated with measurement slide (106). For the currently preferred embodiment, the latching technology comprises a peg and hole system with the peg being associated with the latching device and the holes being defined by, or associated with, outer member (102). Latching device (110) comprises a latch base (80) movably associated with a peg holder (84) at based pivot point (83) and latch lever pivot point (85) via a pivot member. Latch base (80) is mechanically associated with measurement slide (106) at a plurality of latching base interfaces (82). Latch lever (87) of latching device (110) comprises an elongated cambered arm defining a first end and an opposing second end wherein the distance half way between such first end and such opposing second end defines the center point of latch lever (87). The first end is configured for receiving a latch peg (86). A lever pivot point (85) is disposed between said first end and the center point and is configured for receiving a pivot member so that latch lever (87) may be movably associated with said latch base (80) at pivot point (83). One of ordinary skill in the art will appreciate that such a configuration creates a lever point at said center point when applying a force at said second end of latch lever (87) and will cause said first end and associated lever peg (86) of latch lever (87) to rise. Such lever peg (86) is configured for mechanically associating with any one of a plurality of peg receivers associated with outer member (102) (see FIG. 11 for close up view).

Figure 11:
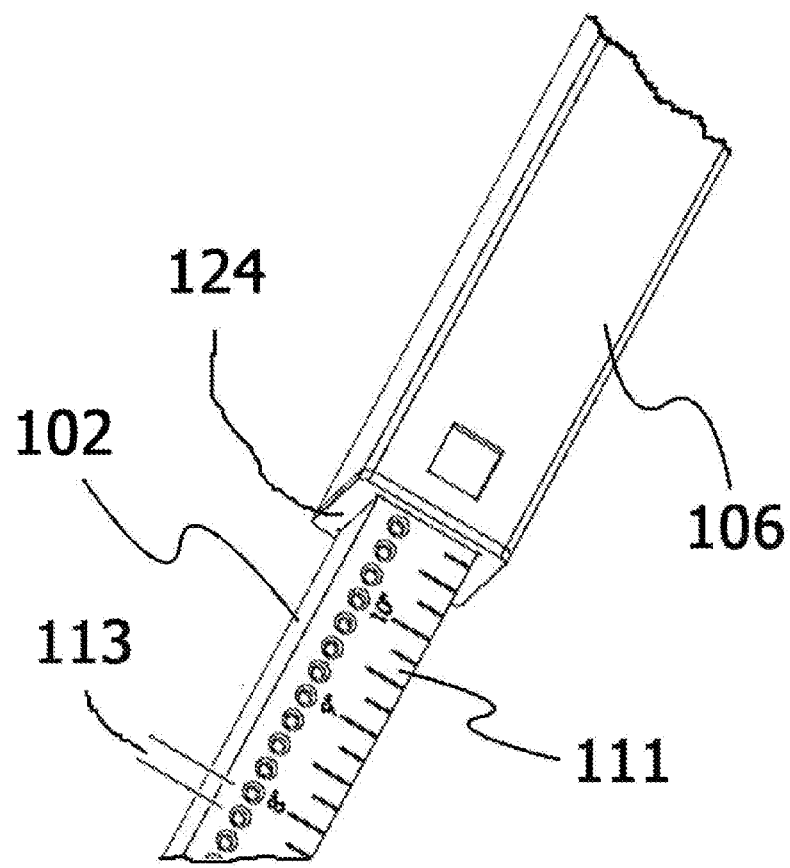
FIG. 11 is a close up side perspective view of and exemplary measurement scale and associated pin receivers.
Figure 12:
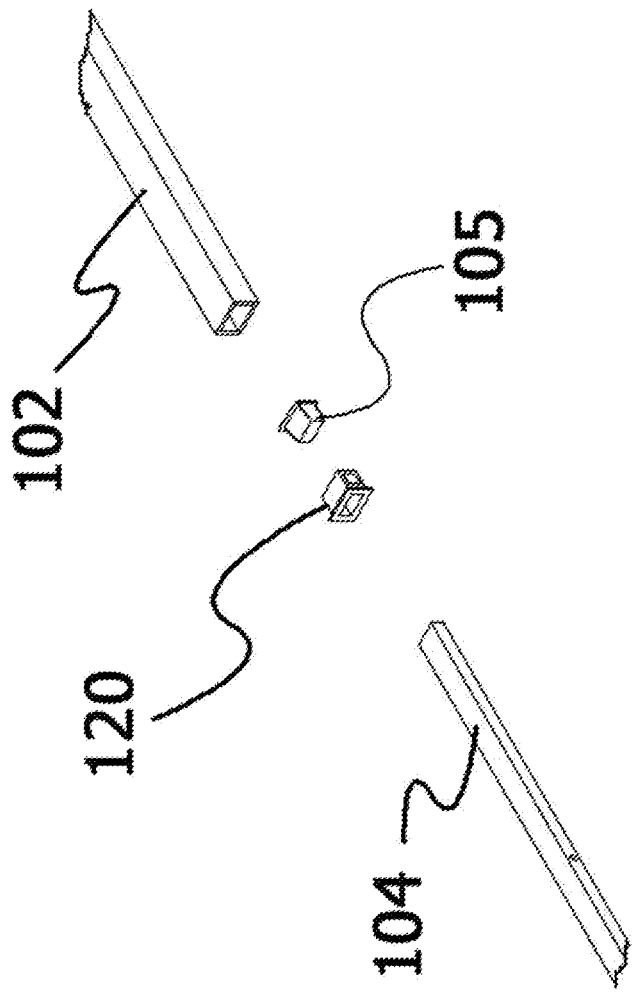
FIG. 12 is a side perspective exploded view of an exemplary inner member, bushing, inner member end cap, and outer member.
Figure 13:
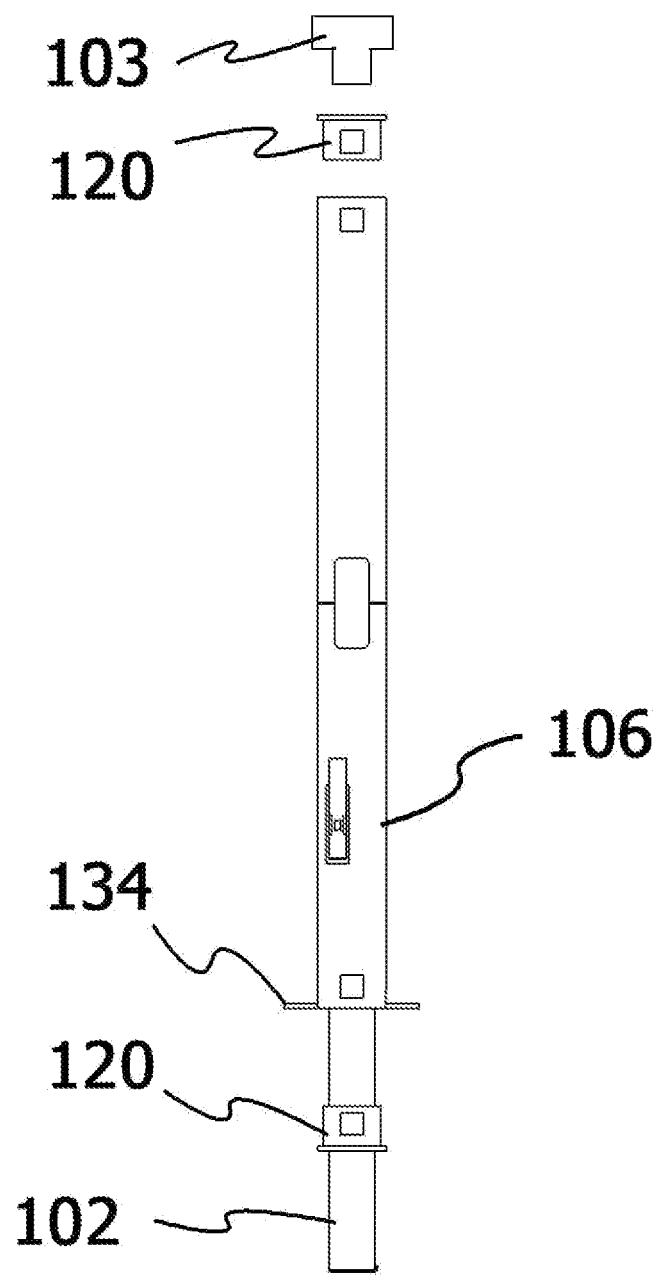
FIG. 13 is a side perspective exploded view of an exemplary outer member, measurement slide, two measurement slide bushings, and outer member end cap.
Figure 14:
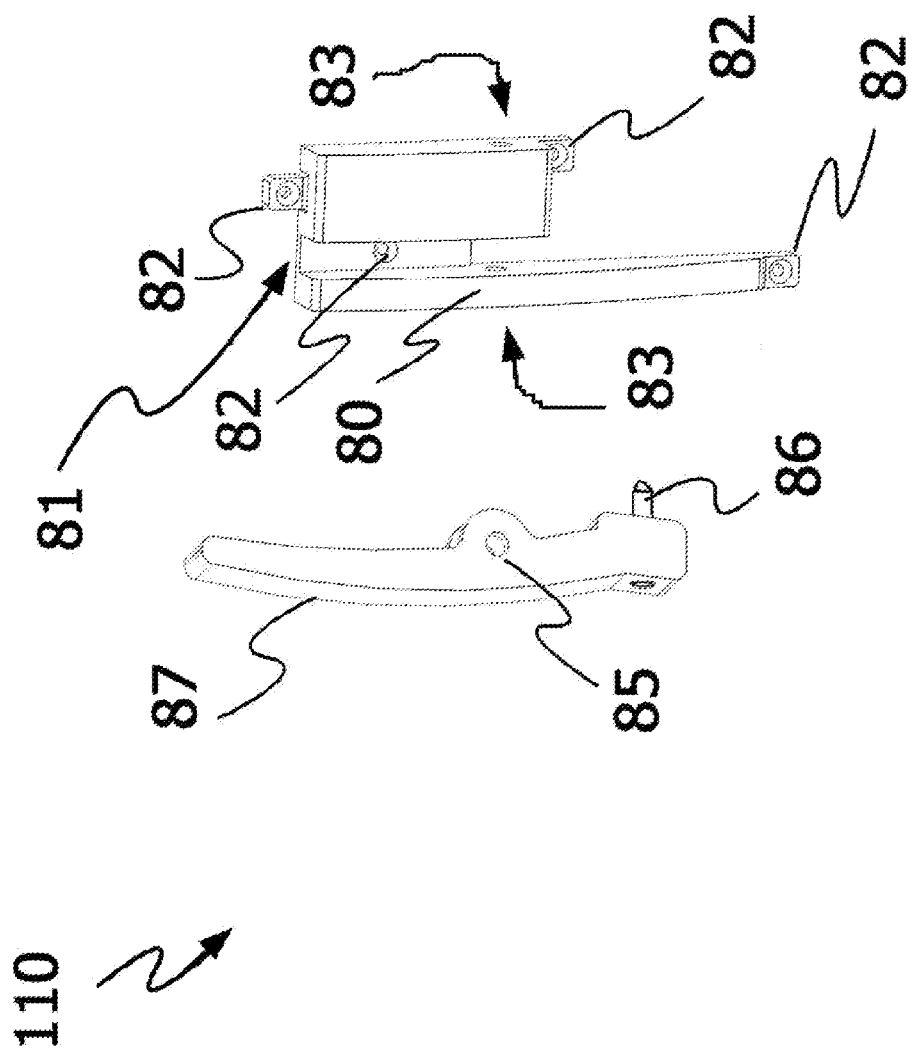
FIG. 14 is a top perspective view of and exemplary latching device comprising a latching pin.

As depicted in FIG. 11, a series of peg receivers (i.e. holes) are defined along the measurement scale (111) at predefined intervals (113) which are preferably all equal in length. For the preferred embodiment, predefined interval (113) is a quarter inch.

For this embodiment of the invention, a user applies a pressing force on the second end of latch lever (87) causing the lever pin (86) to rise and disassociate from a peg receiver. The user then moves measurement slide (106) to perform a desired measurement and removes the pressing force from the second end of latch lever (87) and causing latching pin (86) to mechanically associate with a peg receiver thereby latching measurement slide (106) at the desired measurement location.

One of ordinary skill in the art will appreciate that such a configuration limits the resolution of the possible measurements to the distance between adjacent peg receivers. For the embodiment depicted in FIG. 11 such a resolution is limited to predefined interval (113) (i.e. quarter inch). For one possible alternative embodiment of the invention, a second series of holes are disposed on the opposing side of the measurement scale (111) and offset by a one eighth ($\frac{1}{8}^{th}$) of an inch from the first series of holes on the opposing side (and the scale (111) may also be configured to include ⅛ inch increments). For such configuration the latching device (110) comprises a second latch lever (87) and associated latch peg (86) in alignment with said second series of holes. For such a configuration a latching peg may be associated with a hole on either side thereby doubling the resolution of the measurement system.

Figure 15:
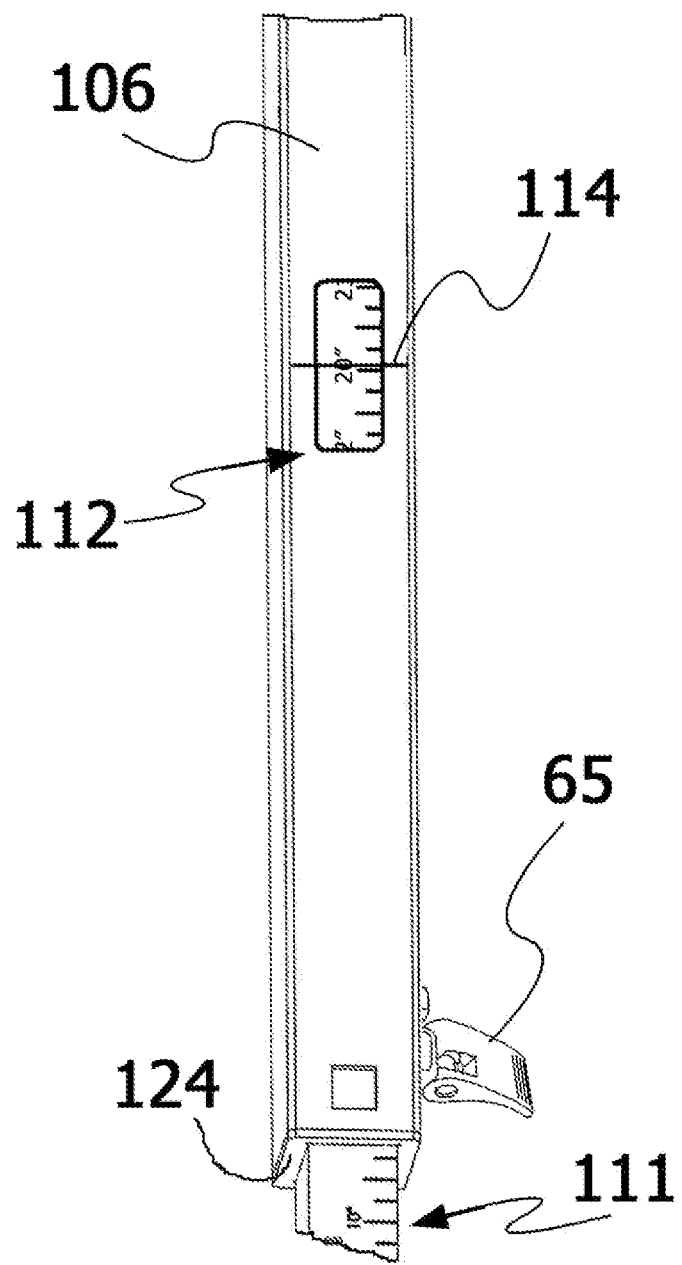
FIG. 15 is a front close up view of one alternative embodiment of the invention comprising a flip lock latching mechanism.

For yet another alternative embodiment of latching device (110), as depicted in FIG. 15, the "hole and peg system" is replaced by a flip lock (65) system (or similar system). For such configuration a flip-flop is associated with measurement slide (106) that may be engaged at any point along the outer member (102) thereby making the measurement scale (111) resolution the limiting measurement element.

Measurement Scales

As best seen in FIG. 11, a surface of outer member (102) defines a measurement scale (111). Measurement scale (111) may be of any type and unit desired (e.g. metric, British Imperial, U.S., Japanese, Chinese Imperial, That, etc.). For the current embodiment, measurement scale (111) is in feet (i.e. US units). Notably, for one possible alternative embodiment, a second scale preferably comprising units different than those used for scale (111) may be associated with outer member (102).

Preferably, measurement scale (1110 uses the same units (such as inches) as the units used to identify the predefined distance (118) so that the numbers can be directly added without then need for conversions. Stated differently, preferably the predefined distance (118) is not scaled in units of "feet" while the measurement scale is scaled in units of "inches". Similarly unit systems should not be mixed (such as metric and US). For example, centimeters should not be used to define the predefined distance (118) and inches used to define measure scale (111). That said, it is envisioned that some embodiments adjustable grade finder (14) will two different units systems at both points. For example, the predefined distance (118) can be defined by both inches and centimeters while measurement scale (111) is also defined by inches and centimeters. Notably, for such a configuration, the inner member (104) could define attachment points (118) at periodic intervals of 12 inches for the first scale and 30 centimeters for the scale (for example, to simplify any calculations needed as described above).

Measurement slide (106) further defines a measurement window (112) to facilitate viewing a point on scale (111) associated with outer member (102) at measurement marker (114). For example, as depicted in FIG. 15, measurement scale (111) can be seen in measurement window (112) and measurement marker (114) is indicated a reading of about 20 inches.

It will be appreciated that for the preferred embodiment outer member (102), inner member (104) are each one integral piece although such components may be constructed from a plurality of individual pieces mechanically associated to form the desired member. Measurement slide (106) may be a multiple piece component or one integral piece. Additionally, while the preferred embodiment depicts members and slides that define rectangular shapes other polygon shapes may be used as well as circular shapes without departing from the scope and spirit of the present invention. Preferably, inner member (104), outer member (102) and measurement slide (106) are constructed from a lightweight metallic material such as aluminum whereas the various bushings are constructed from a nonmetallic material such as plastic, fiberglass, any suitable thermoplastic polymers such as polycarbonate or PVC.

Method

One method of using an adjustable grade finder (14) to determine a distance delta without the need for making calculations is now considered. For this example, a prior art laser system and leveling pole associated with an adjustable grade finder is used. It should be appreciated, however, that the basic method disclosed below may be used with other well-known prior art systems, other than laser systems, without departing from the scope of the invention. Additionally, the adjustable grade finder (14) may be further configured to grade finder function without the use devices such as prior art leveling poles.

For the currently method, the first step is to associate a leveling pole (12) with the adjustable grade finder (14) by placing the bottom edge of such leveling pole on top of support interface (34) and mechanically associating the leveling pole to the adjustable grade finder (14) using attachment points (22) or other suitable devices such as straps. If a leveling pole is not used, skip step one (notably, the use of a leveling pole is optional as a leveling pole (12) simply extends the maximum height range of the measurement system). The next step is to associate a substance detector with one of (a) a leveling pole mechanically associated with an adjustable grade finder (14) and (b) an adjustable grade finder (14). Thus, if a leveling pole (12) is used, it is now mechanically associated with outer section (32) so that the leveling pole (12) does not move relative to outer section (32) and a substance detector is associated with the leveling pole. It should be further appreciated that the leveling pole (12) is in vertical alignment with adjustable grade finder (14) as depicted in FIG. 1. The next step is to position a substance emitter on a tripod somewhere outside the area to be leveled, preferably, so that the laser emitter emits a laser light across the entire area to be leveled or at least the portion thereof. One embodiment of a substance emitter is a laser based system and one example of a substance detector is a laser detector. For the remainder of this example method, the terms laser emitter and laser detector are used.

The next step is to establish one point that represents the final finished surface height or "reference point/height" and vertically position the adjustable grade finder (14) at such reference point (example "A" in FIG. 7). Next a laser detector (16) is moved along measuring pole (12) (if one is used, if not, along the adjustable grade finder) until the laser detector (16) indicates that it has detected the emitted laser light and then the laser detector (16) is mechanically associated with leveling pole (12) so that it no longer moves relative to the leveling pole (12) (or adjustable grade finder outer member or measurement slide depending on the configuration). Ideally, for all such measurements, if the adjustable grade finder is configured with a HV Indicator, it should indicate the system is both horizontal and plumb. Notably, at this point the adjustable grade finder's (14) distance delta indicator (52) should be at the zero point as show for example "A" of FIG. 7 (although non-zero default distances can be used).

Next the adjustable grade finder (14) system is moved to a second point (example "B" in FIG. 7). The user, holding outer member (32), causes outer member (32) to move up/down (as required for the point of interest) along inner member (30) (while the second end of the inner member stays on the support surface) until the laser detector (16) indicates that it has detected the emitted laser light (with the HV indicator indicating horizontal and plumb). As shown in example "B" of FIG. 7, the distance delta indicator (52) is at the 1.5 unit (such as "feet") mark on scale (38) provided at the end of inner member (30). Such indicates that point "B" is 1.5 "units" lower than reference point "A". If the scale (38) has units of feet, then point "B" is 1.5 feet lower than the reference point "A".

Next the adjustable grade finder is moved to point "C" and the process repeated. Continuing with the example depicted in FIG. 7, this time the distance delta indicator (52) indicates that point "C" is 1 foot higher than the reference point "A". As one of ordinary skill in the art will appreciate, such an apparatus quickly yields relative distance measurements (deltas) without the need for performing calculations.

Further, if for the above examples the offset value (35) is two feet, and the laser detector is positioned at the three feet point along the leveling pole for all three measurements, we know that Point A is at an absolute height of five feet (2 feet+3 feet), and Point B is at an absolute height of 3.5 feet (2 feet+3 feet−1.5 feet), and Point C is at an absolute height of six feet (2 feet+3 feet+1 foot). Thus, while some calculations for absolute measurements are require, by selecting the scales wisely, such calculations are easy and minimized in number greatly reducing the possibly of error.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An adjustable grade finder comprising:
   an outer member defining an elongated OM-structure having an OM-first-end and an opposing OM-second-end wherein said OM-structure is at least partially hollow thereby defining an OM-outside perimeter and an OM-inside perimeter;
   an inner member defining an elongated IM-structure having an IM-first-end, an opposing IM-second-end, and wherein the outer perimeter of said IM-structure is smaller than said OM-inside perimeter and wherein said IM-first-end is configured for being inserted into and movably associated with said OM-first end to form a telescopic association;
   a measurement scale associated with said IM-first-end; and
   a measure window defined by said outer member and configured to allow a user to view said measurement scale.

2. An adjustable grade finder as in claim 1, wherein said inter member is at least partially hollow thereby defining a IM-outside perimeter and an IM-inside perimeter.

3. An adjustable grade finder as in claim 1, further comprising a support interface that is one of: (a) integral to said OM-structure and (b) mechanically associated with said OM-structure.

4. An adjustable grade finder as in claim 3, further comprising a resilient component defining a RC-first-end mechanically associated with said inner member and a RC-second-end mechanically associated with said outer-member and wherein said resilient member is configured to maintain a default position between said outer member and said inner member when no measure force is being applied to the adjustable grade finder.

5. An adjustable grade finder as in claim 4, wherein said IM-structure is at least partially hollow thereby defining an IM-outside perimeter and an IM-inside perimeter and wherein said resilient component defines an RC-outside perimeter that is smaller than said IM-inside perimeter and wherein said resilient component is disposed at least partially inside said IM-structure.

6. An adjustable grade finder as in claim 4, wherein said default position defines an offset distance representing the distance from said IM-second-end and said support surface.

7. An adjustable grade finder as in claim 6, wherein said OM-structure is about thirty-two inches long and said IM-structure is about sixty inches long.

8. An adjustable grade finder as in claim 6, wherein the length of said IM-structure is adjustable.

9. An adjustable grade finder comprising:
   an outer member defining an elongated OM-structure having an OM-first-end and an opposing OM-second-end wherein said OM-structure is at least partially hollow thereby defining an OM-outside perimeter and an OM-inside perimeter;
   an inner member defining an elongated IM-structure having an IM-first-end, an opposing IM-second-end, and wherein the outer perimeter of said IM-structure is smaller than said OM-inside perimeter and wherein said IM-first-end is configured for being inserted into and movably associated with said OM-first end to form a telescopic association;
   a measurement slide defining a MS-structure having a MS-first-end and an opposing MS-second-end wherein said MS-structure is hollow thereby defining a MS-outside perimeter and a MS-inside perimeter and wherein said MS-inside perimeter is larger than said OM-outside perimeter and wherein said OM-structure is inserted through said MS-structure;
   a measurement scale that is one of (a) defined by and (b) associated with said outer member; and
   a measurement window defined by said measure slide and configured to allow a user to view said measure scale.

10. An adjustable grade finder as in claim 9, wherein said inter member is at least partially hollow thereby defining an IM-outside perimeter and an IM-inside perimeter.

11. An adjustable grade finder as in claim 9, wherein the distance from said OM-first-end and said OM-second-end is about 60 inches and wherein the distance from said IM-first-end and said IM-second-end is about 59 inches and wherein the distance from said MS-first-end and said SM-second-end is about 17 inches.

12. An adjustable grade finder as in claim 9, wherein said OM-structure and said IM-structure defined at least one attachment point for securing the movable association between said OM-structure and said IM-structure.

13. An adjustable grade finder as in claim 12, wherein said IM-structure defined a plurality of attachment point disposed along said IM-structure at predefined intervals and wherein the first attachment point is said predefined distance from said IM-second-end.

14. An adjustable grade finder as in claim 9, further comprising a latching device that is one of (a) integral to said measurement slide and (b) mechanically associated with said measurement slide wherein said latching device is configured for selectively preventing measurement slide movement relative to said OM-structure.

15. An adjustable grade finder as in claim 14, wherein said latching device comprises a latch base movably associated with a latch lever comprising a latching peg at one end wherein said latching peg is configured for mechanically associating with any one of a plurality of latching peg receivers defined by said OM-structure and wherein the distance between adjacent peg receivers is a predefined distance.

16. An adjustable grade finder as in claim 14, wherein said latching device comprises a flip lock.

17. An adjustable grade finder as in claim 14, further comprising a support interface that is one of: (a) integral to said MS-structure and (b) mechanically associated with said MS-structure.

18. A method of determining the distance delta between two points, said method comprising the steps of:
   positioning a substance emitter a predefined distance away from the location of the points to be measured so that the height of said substance emitter is vertically and horizontally stable and so that the substance being emitted travels across the surface for which the measurements are to be taken;
   positioning, at a first point, an adjustable measurement tool comprising a measurement scale and one of (a) an adjustable grade finder comprising a stationary member and a moving member, and (b) an adjustable grade finder comprising a stationary member and a moving member wherein a leveling pole is mechanically associated with said moving member;
   wherein one end of said stationary member is supported by the surface being measured;
   selectively moveably associating a substance detector with one of (a) said movable member, and (b) said leveling pole and moving said substance detector along one of (a) said movable member, and (b) said leveling pole until said substance detector is indicating the detection of said substance;
   securing said substance detector so that it does not move relative to said one of (a) said movable member and (b) said leveling pole;
   moving said adjustable grade finder to a second point so that one end of said stationary member is supported by the surface being measured; and
   moving as necessary said movable member until said substance detector is indicating the detection of said substance thereby causing the adjustable grade finder measurement scale to indicate a distance delta.

19. A method of determining the distance delta between two points as in claim 18, wherein said substance emitter comprises a laser and said substance detector comprises a laser detector.

20. A method of determining the distance delta between two points as in claim 18, wherein said adjustable grade finder comprises an HV Indicator.

\* \* \* \* \*